(12) United States Patent
Tanizaki et al.

(10) Patent No.: US 10,145,698 B2
(45) Date of Patent: Dec. 4, 2018

(54) ROUTE SEARCH SYSTEM, ROUTE SEARCH METHOD, AND COMPUTER PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Daisuke Tanizaki, Okazaki (JP); Toyoji Hiyokawa, Okazaki (JP); Tatsuya Kato, Anjo (JP); Motohiro Nakamura, Okazaki (JP); Kazunori Watanabe, Okazaki (JP); Hiroyuki Tashiro, Kitakyushu (JP); Kei Hiroo, Kitakyushu (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 15/503,858

(22) PCT Filed: Aug. 31, 2015

(86) PCT No.: PCT/JP2015/074661
§ 371 (c)(1),
(2) Date: Feb. 14, 2017

(87) PCT Pub. No.: WO2016/035744
PCT Pub. Date: Mar. 10, 2016

(65) Prior Publication Data
US 2017/0350715 A1   Dec. 7, 2017

(30) Foreign Application Priority Data
Sep. 3, 2014 (JP) .................. 2014-178892

(51) Int. Cl.
*G01C 21/34* (2006.01)
*G08G 1/09* (2006.01)
(Continued)

(52) U.S. Cl.
CPC ......... *G01C 21/3453* (2013.01); *G01C 21/34* (2013.01); *G08G 1/09* (2013.01);
(Continued)

(58) Field of Classification Search
CPC .... G01C 21/3492; G01C 21/36; G01C 21/32; G01C 21/30; G01C 21/26; G01C 21/3453;
(Continued)

(56) References Cited

U.S. PATENT DOCUMENTS 6,233,519 B1 * 5/2001 Yamada ................. G01C 21/28
340/988
2006/0082472 A1   4/2006 Adachi et al.
(Continued)

FOREIGN PATENT DOCUMENTS

EP     1 640 691 A2   3/2006
JP    2004-220574 A   8/2004
(Continued)

OTHER PUBLICATIONS

Aug. 14, 2017 Supplementary Search Report issued in European Application No. 15837646.7.
(Continued)

*Primary Examiner* — Behrang Badii
(74) *Attorney, Agent, or Firm* — Oliff PLC

(57) ABSTRACT

Route search systems, methods, and programs search for a recommended route using a cost value of a link or a node that constitutes a route. The systems, methods, and programs calculate the cost value of the link or the node on the basis of calculation material information that serves as a material
(Continued)

for calculating the cost value, and specify a reliability degree of the calculated cost value of the link or the node on the basis of a number of pieces of the calculation material information used to calculate the cost value of the link or the node. The systems, methods, and programs correct the cost value of the link or the node, the reliability degree of which has been specified, on the basis of the specified reliability degree, and search for the recommended route using the corrected cost value.

13 Claims, 10 Drawing Sheets

(51) Int. Cl.
*G08G 1/0969* (2006.01)
*G08G 1/00* (2006.01)
*G01C 21/36* (2006.01)
*G01S 19/47* (2010.01)
*G01S 19/49* (2010.01)
*G01C 21/30* (2006.01)
*G01C 21/26* (2006.01)

(52) U.S. Cl.
CPC ............. *G08G 1/0969* (2013.01); *G08G 1/20* (2013.01); *G01C 21/26* (2013.01); *G01C 21/30* (2013.01); *G01C 21/3492* (2013.01); *G01C 21/36* (2013.01); *G01C 21/3691* (2013.01); *G01S 19/47* (2013.01); *G01S 19/49* (2013.01)

(58) Field of Classification Search
CPC .. G01C 21/34; G01C 21/3691; G01C 21/367; G08G 1/00; G08G 1/09; G08G 1/0969; G08G 1/20; G08G 1/0112; G08G 1/0141; G08G 1/096827; G08G 1/096844; G08G 1/0129; G08G 1/096716; G08G 1/096741; G08G 1/096783; G01S 19/47; G01S 19/49; G06K 9/00711; G06K 9/18; G06K 9/4633; G06K 9/6201; G09B 29/10; G09B 29/00; G06T 7/64; G06T 7/60; G07C 5/0808; G07C 5/0866; B60C 23/20; B60C 23/06; B60C 11/246

See application file for complete search history.

(56) References Cited

U.S. PATENT DOCUMENTS

| | | | | |
|---|---|---|---|---|
| 2010/0217524 | A1* | 8/2010 | Oohashi | G01C 21/30 701/472 |
| 2012/0029800 | A1* | 2/2012 | Kluge | G01C 21/32 701/117 |
| 2015/0362323 | A1* | 12/2015 | Koshizen | G01C 21/3492 701/430 |

FOREIGN PATENT DOCUMENTS

| | | |
|---|---|---|
| JP | 2006-031422 A | 2/2006 |
| JP | 2007-071579 A | 3/2007 |
| JP | 2008-250454 A | 10/2008 |
| JP | 2010-140135 A | 6/2010 |
| JP | 2012-141145 A | 7/2012 |

OTHER PUBLICATIONS

Nov. 17, 2015 International Serach Report issued in Patent Application No. PCT/JP2015/074661.

* cited by examiner

FIG. 3

| DATE OF TRAVEL | TIME OF TRAVEL | WEATHER | VEHICLE ID | VEHICLE SPEED (km/h) | LINK TRAVELED | POSITION COORDINATE | TRAVEL DIRECTION |
|---|---|---|---|---|---|---|---|
| 2014/5/10 | 10:00:00 | SUNNY | A | 40 | 100001 | x1, y1 | UP |
| 2014/5/10 | 10:01:03 | SUNNY | B | 32 | 120001 | x2, y2 | DOWN |
| 2014/5/10 | 10:07:35 | SUNNY | C | 0 | 140001 | x3, y3 | DOWN |
| 2014/5/10 | 10:15:08 | SUNNY | D | 45 | 140001 | x4, y4 | UP |
| ... | ... | ... | ... | ... | ... | ... | ... |

FIG. 4

PROBE STATISTICAL INFORMATION (DISTRIBUTION INFORMATION)

| LINK ID | TRAVEL DIRECTION | LINK FOR ENTRY | LINK FOR EXIT | DATE | TIME BAND | WEATHER | NUMBER N OF PIECES OF INFORMATION | CONGESTION DEGREE | AVERAGE TRAVEL TIME |
|---|---|---|---|---|---|---|---|---|---|
| 100001 | UP | 100002 | 100003 | 5/10 | 10:00~10:15 | SUNNY | 6567 | CROWDED | 25 sec |
| 100001 | UP | 100002 | 100003 | 5/10 | 10:15~10:30 | SUNNY | 4786 | CROWDED | 28 sec |
| ... | ... | ... | ... | ... | ... | ... | ... | ... | ... |
| 10001 | DOWN | 100003 | 100002 | 5/10 | 10:00~10:15 | SUNNY | 12345 | UNCROWDED | 18 sec |
| 10001 | DOWN | 100003 | 100002 | 5/10 | 10:15~10:30 | SUNNY | 10443 | UNCROWDED | 17 sec |
| ... | ... | ... | ... | ... | ... | ... | ... | ... | ... |

FIG. 7

| RELIABILITY DEGREE | ALLEVIATION DEGREE | CORRECTION COEFFICIENT |
|---|---|---|
| 1 (HIGH) | 1 (SMALL) | 1.0 |
| | 2 (MEDIUM) | 1.2 |
| | 3 (LARGE) | 1.4 |
| 2 | 1 | 1.2 |
| | 2 | 1.4 |
| | 3 | 1.6 |
| 3 | 1 | 1.4 |
| | 2 | 1.6 |
| | 3 | 1.8 |
| 4 (LOW) | 1 | 1.6 |
| | 2 | 1.8 |
| | 3 | 2.0 |

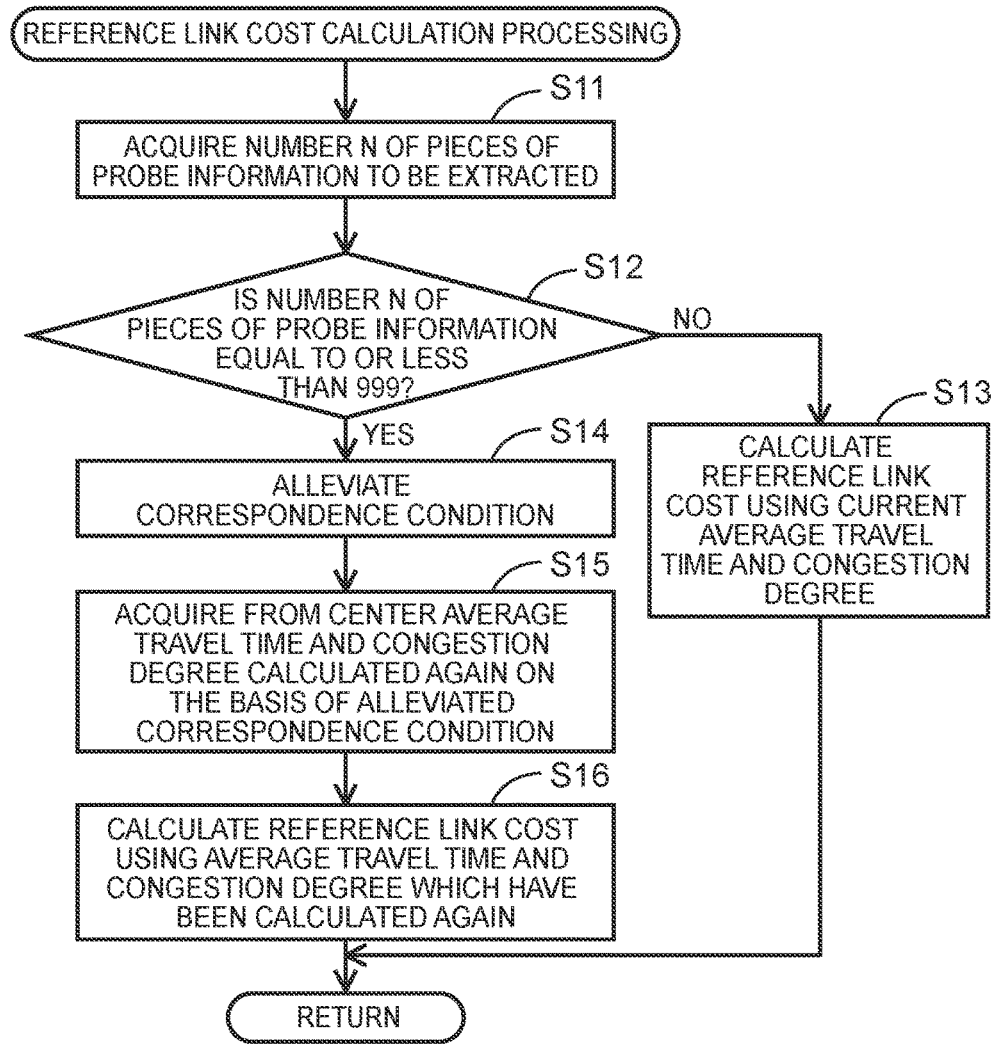
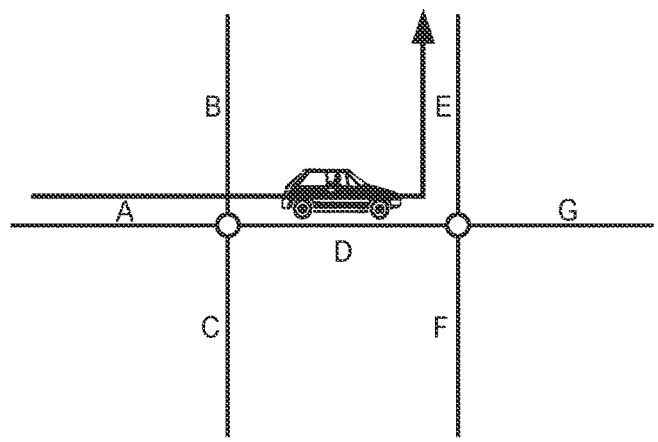

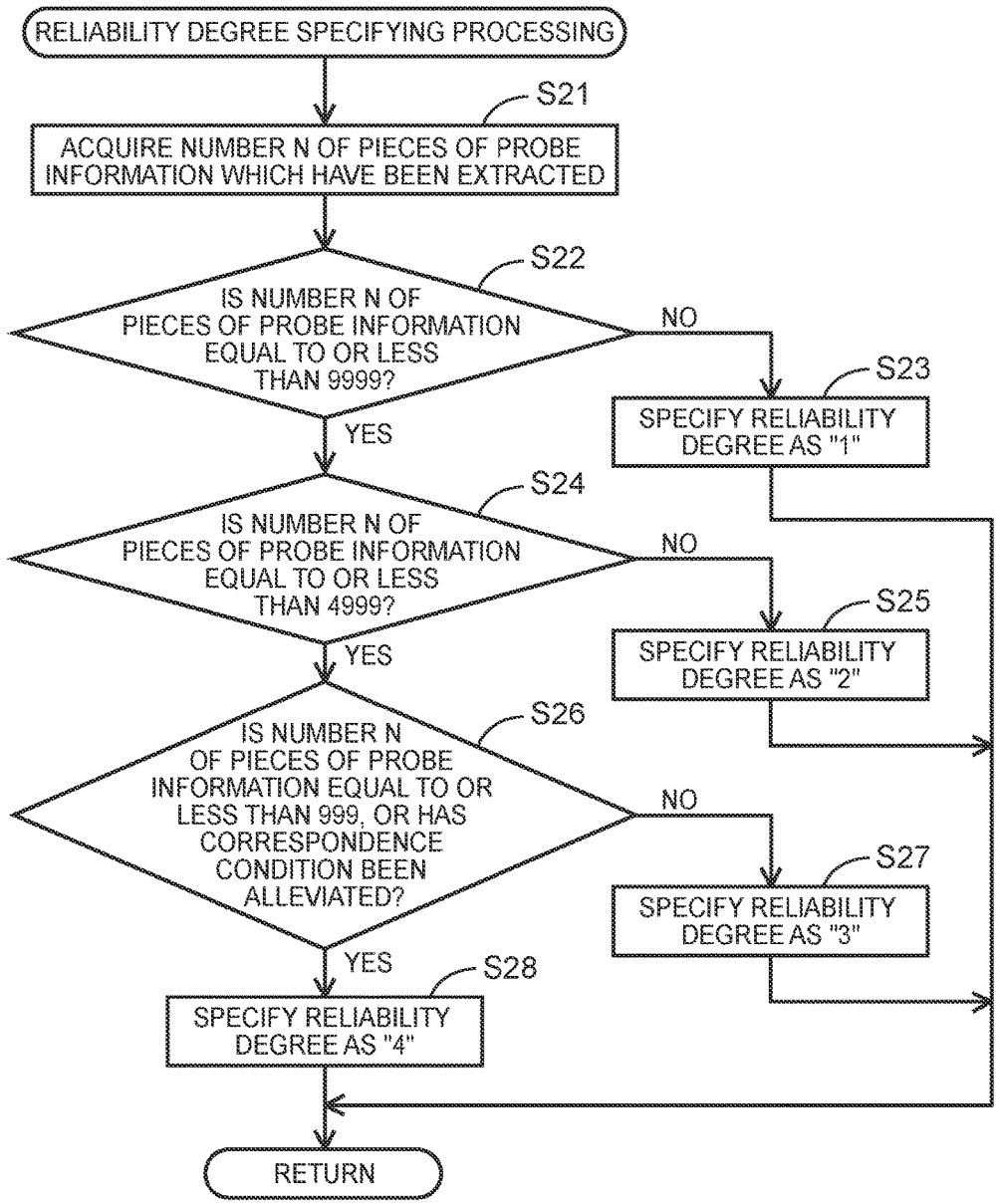

ROUTE SEARCH SYSTEM, ROUTE SEARCH METHOD, AND COMPUTER PROGRAM

TECHNICAL FIELD

Related technical fields include route search systems, methods, and a computer programs for searching for a recommended route using a cost value.

BACKGROUND

In recent years, many vehicles are provided with a navigation apparatus that provides travel guidance for the vehicle to allow a driver to easily reach a desired destination location. The navigation apparatus is a device that can detect the current position of the vehicle using a GPS receiver or the like and acquire map data corresponding to the current position from a storage medium such as a DVD-ROM or an HDD or through a network to display the map data on a liquid crystal monitor. Furthermore, such a navigation apparatus is provided with a route search function for searching for an optimum route from the vehicle position to a desired destination location when the destination location is input, and adapted to set the optimum route found in the search as a route for guidance, display the route for guidance on a display screen, and provide audio guidance in the case where the vehicle approaches an intersection or the like in order to reliably guide a user to the desired destination location. In recent years, in addition, some cellular phones, smartphones, tablet terminals, personal computers, and so forth also have a function that is similar to that of the navigation apparatus described above.

For the route search function described above, a Dijkstra's algorithm is generally used as a route search method for searching for a route from a departure location to a destination location. In the Dijkstra's algorithm, a search cost (link cost, intersection cost) is calculated for each link included in the route and each node corresponding to an intersection, and an optimum route is specified on the basis of the sum of the calculated search costs. The search cost is also calculated on the basis of various parameters such as the average travel time, which is the average value of times required for vehicles to pass through a link, and the congestion degree, which indicates the degree of congestion of a link. The average travel time and the degree of congestion are specified by a server by statistically processing probe information and information (hereinafter referred to as calculation material information) collected by vehicle detectors, optical beacons, and so forth installed on roads, for example, as described in Japanese Patent Application Publication No. 2007-71579 (JP 2007-71579 A).

SUMMARY

Here, if the number of pieces of the calculation material information used to calculate the value of the search cost is large, the average travel time and the degree of congestion are specified with a high reliability degree, as a result of which the value of the search cost is made accurate to improve the quality of the route to be found. If the number of pieces of the calculation material information used to calculate the value of the search cost is small, on the other hand, the average travel time and the degree of congestion are specified with a low reliability degree, as a result of which the value of the search cost is made inaccurate to lower the quality of the route to be found. For example, the number of pieces of the calculation material information is small for a route that includes roads with small amounts of traffic, which lowers the quality of the route to be found.

In the technique described in JP 2007-71579 A, however, whether the reliability degree of the information is high or low is not taken into consideration in calculating the average travel time and the congestion degree. Thus, an appropriate route may not be found if route search is performed using the average travel time and the congestion degree which have been calculated.

Exemplary embodiments of the broad inventive principles described herein address the foregoing issue of the related art, and therefore have an object to provide a route search system, a route search method, and a computer program capable of finding a more appropriate route for a user by correcting a cost value in consideration of the reliability degree of the cost value.

Exemplary embodiments provide route search systems, methods, and programs that search for a recommended route using a cost value of a link or a node that constitutes a route. The systems, methods, and programs calculate the cost value of the link or the node on the basis of calculation material information that serves as a material for calculating the cost value, and specify a reliability degree of the calculated cost value of the link or the node on the basis of a number of pieces of the calculation material information used to calculate the cost value of the link or the node. The systems, methods, and programs correct the cost value of the link or the node, the reliability degree of which has been specified, on the basis of the specified reliability degree, and search for the recommended route using the corrected cost value.

With the route search system, the route search method, and the computer program configured as described above, it is possible to find a more appropriate route for a user, even in the case where the route includes roads with small amounts of traffic, by correcting the cost value of a link or a node used for route search in consideration of the reliability degree of the cost value.

BRIEF DESCRIPTION OF THE DRAWINGS

FIG. 3 illustrates an example of probe information stored in a probe information DB.

FIG. 4 illustrates an example of probe statistical information stored in the probe statistical information DB.

FIG. 7 illustrates a method of setting a correction coefficient on the basis of a combination of the reliability degree and the alleviation degree.

FIG. 8 is a flowchart of a sub processing program of a reference link cost calculation processing.

FIG. 9 illustrates a method of alleviating a correspondence condition.

FIG. 10 is a flowchart of a sub processing program of a reliability degree specifying processing.

DETAILED DESCRIPTION OF EXEMPLARY EMBODIMENTS

Figure 1:
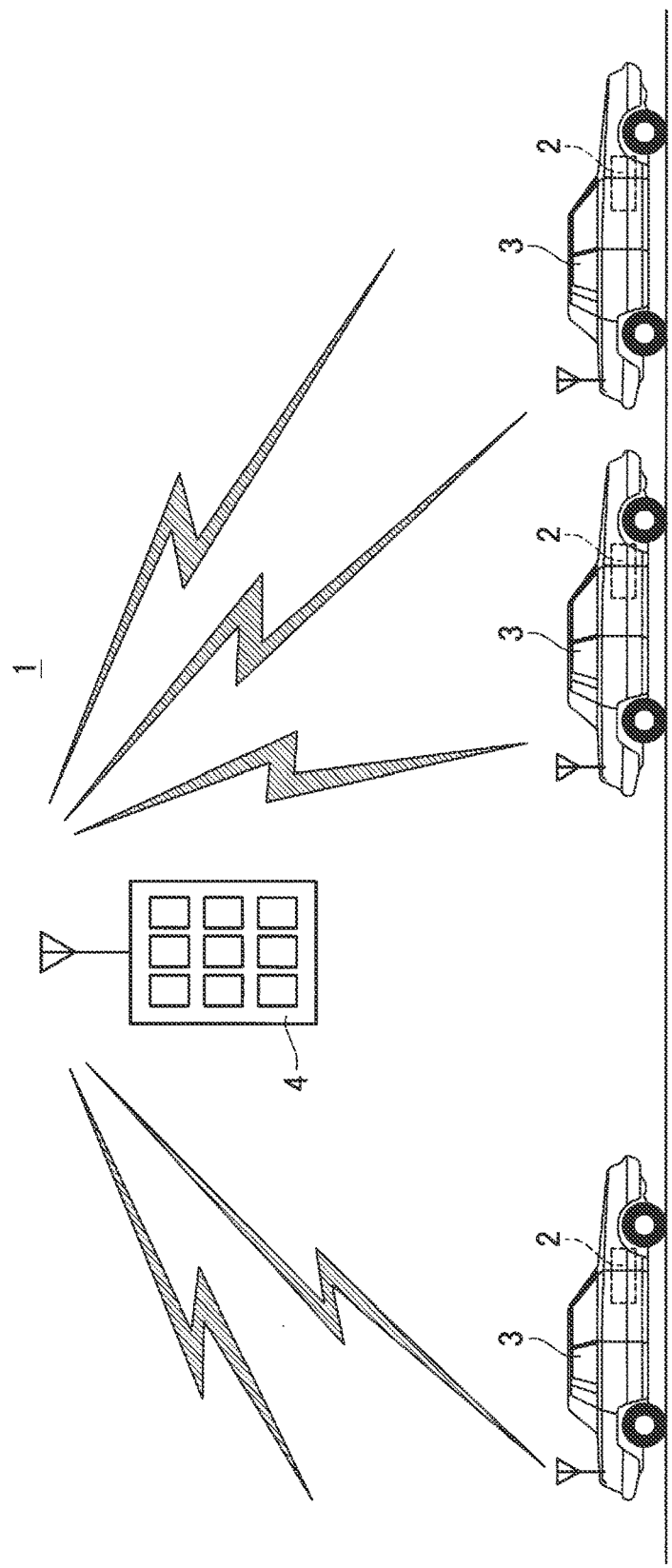
FIG. 1 illustrates a schematic configuration of a route search system according to an embodiment.
Figure 2:
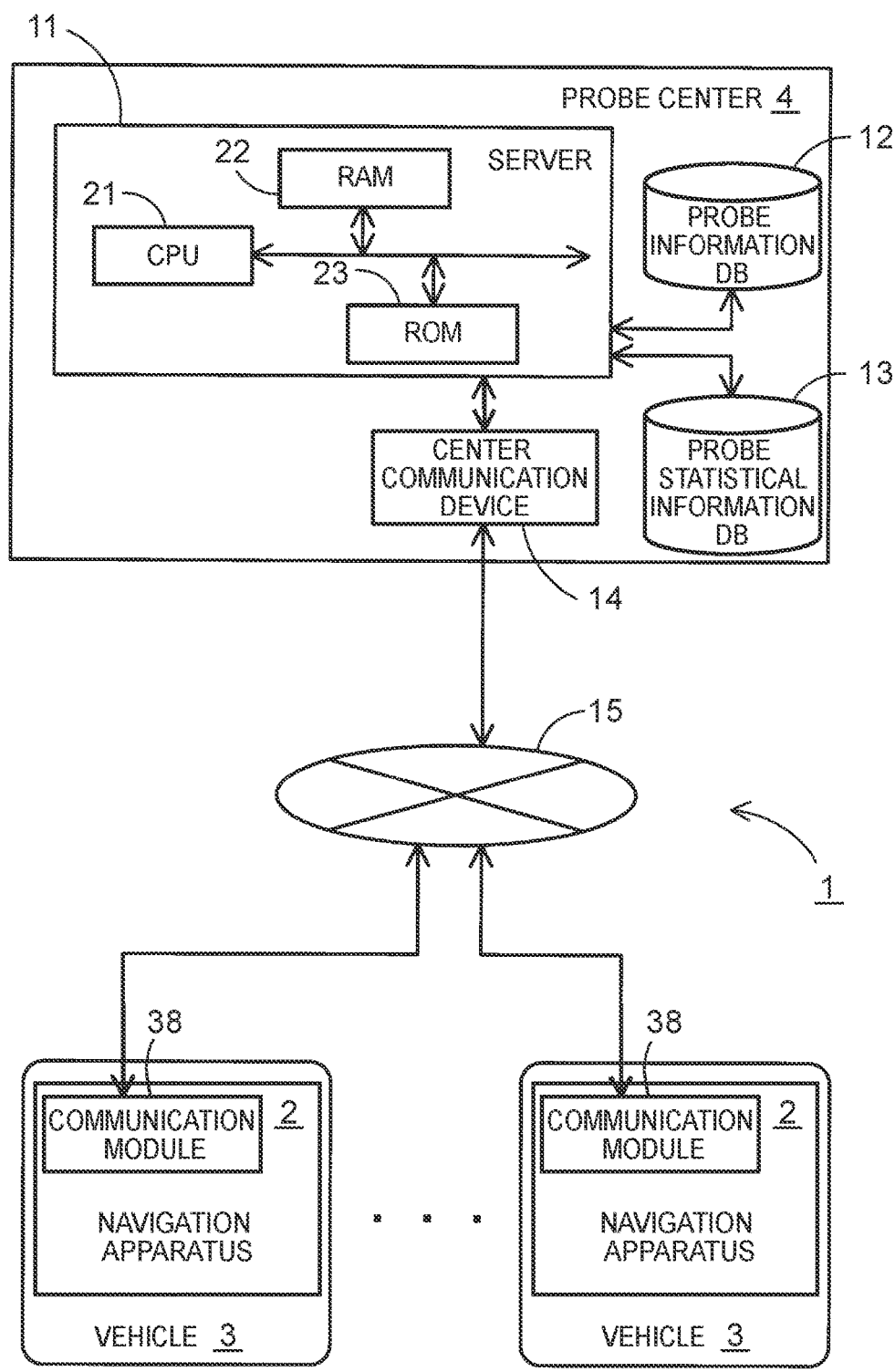
FIG. 2 is a block diagram illustrating the configuration of the route search system according to the embodiment.

A route search system according to a specific embodiment will be described in detail below with reference to the drawings. First, a schematic configuration of a route search system 1 according to the embodiment will be described with reference to FIGS. 1 and 2. FIG. 1 illustrates a schematic configuration of the route search system 1 according to the embodiment. FIG. 2 is a block diagram illustrating the configuration of the route search system 1 according to the embodiment.

As illustrated in FIG. 1, the route search system 1 according to the embodiment has vehicles 3 on each of which a navigation apparatus 2 is mounted, and a probe center 4 that collects probe information (calculation material information) from each of the vehicles 3 and that prepares and distributes traffic information or the like based on the collected probe information. A communication terminal such as a smartphone or a tablet terminal may be used in place of the navigation apparatus 2.

The vehicles 3 are vehicles that travel on roads across the country, and constitute at least a part of a probe car system as probe cars together with the probe center 4 to be discussed later. Here, the probe car system refers to a system that collects information using vehicles as sensors. Specifically, the probe car system refers to a system in which the vehicles 3 regularly transmit speed data and the operating status of various systems such as steering operations and the shift position, together with GPS position information, to the probe center 4 via communication modules for the vehicles (hereinafter referred to simply as communication modules) such as cellular phones and DCMs mounted in advance on the vehicles 3 so that the center reuses collected data as various types of information.

The probe center 4 is an information distribution center that collects and accumulates the probe information including the current time and travel information transmitted from the vehicles 3 which travel across the country, generates, from the accumulated probe information, distribution information (probe statistical information) such as the average travel time, which is the average value of times required for the vehicles to pass through a link, and the congestion degree, which indicates the degree of congestion in a link, and distributes the generated distribution information to the vehicles 3.

The navigation apparatus 2 is installed in each of the vehicles 3. The navigation apparatus 2 is an in-vehicle device that displays a map of an area around the vehicle position on the basis of stored map data, displays the current position of the vehicle on a map image, searches for a route to a set destination location, and provides guidance on the route. The navigation apparatus 2 also provides a user with traffic information such as the congestion degree received from the probe center 4. The navigation apparatus 2 will be discussed in detail later.

Subsequently, the configuration of the probe center 4 of the route search system 1 will be described in more detail with reference to FIG. 2.

As illustrated in FIG. 2, the probe center 4 basically has a server 11, a probe information DB 12 that serves as information recording means connected to the server 11, a probe statistical information DB 13, and a center communication device 14.

The server 11 is an electronic control unit that performs various control in the probe center 4. The server 11 includes a CPU 21 that serves as a computation device and a control device, and internal storage devices such as a RAM 22 used as a working memory when the CPU 21 performs various types of computation processing and a ROM 23 that stores a control program, a program for calculating the average travel time and the congestion degree on the basis of the collected probe information, and so forth.

The probe information DB 12 is storage means for accumulatively storing the probe information collected from the vehicles 3 which travel across the country. In the embodiment, in particular, information on (a) the date and time, (b) the weather, (c) the vehicle speed, (d) the link on which the vehicle 3 travels, (e) the position coordinate of the vehicle 3, and (f) the travel direction of the vehicle 3 is included in the probe information collected from the vehicle 3.

The probe information stored in the probe information DB 12 will be described in more detail below with reference to FIG. 3. FIG. 3 illustrates an example of probe information stored in the probe information DB 12.

As illustrated in FIG. 3, the probe information includes a vehicle ID that identifies the vehicle which transmitted the probe information, information on (a) to (f) described above, and so forth. For example, a piece of the probe information illustrated in FIG. 3 indicates that the vehicle 3 with an ID "A" traveled on a link with an ID "100001" in the up direction at 40 km/h in a sunny weather at 10:00:00 on May 10, 2014. The other pieces of the probe information also include similar information.

The probe center 4 takes statistics of the probe information stored in the probe information DB 12 to specify the average travel time and the congestion degree for each road across the country. Specifically, the probe center 4 extracts pieces of the probe information correlated with the same condition (the same date-and-time classification, the same weather classification, the same travel direction, and the same travel mode (specifically, the direction of entry into the link and the direction of exit from the link)), among the pieces of the probe information stored in the probe information DB 12, and calculates the average vehicle speed and the average travel time on the basis of the extracted pieces of the probe information. The probe center 4 also specifies the congestion degree from the calculated average vehicle speed and the road type of the link. The probe center 4 stores the specified information on the average travel time and the congestion degree in the probe statistical information DB 13 together with the condition (hereinafter referred to as a correspondence condition) under which the pieces of the probe information, from which the specified information was calculated, were extracted. In the case where the number of pieces of the probe information used to calculate the average vehicle speed and the average travel time is particularly small (e.g. in the case where calculation is performed for a link with a small amount of traffic) as discussed later, processing is performed which involves increasing the number of pieces of the probe information used to calculate the average vehicle speed and the average travel time by alleviating the correspondence condition. For example, the condition for the date-and-time classification is alleviated from the "singular-day classification or day-of-the-week classification" to the "weekday (or holiday) classification."

Next, the probe statistical information prepared by the probe center 4 and stored in the probe statistical information DB 13 will be described in detail with reference to FIG. 4. FIG. 4 illustrates an example of the probe statistical information stored in the probe statistical information DB 13.

As illustrated in FIG. 4, the probe statistical information has, for each link that is present across the country and each travel direction, the correspondence condition (date-and-time classification, weather classification, and travel mode (specifically, the direction of entry into the link and the direction of exit from the link are specified by the links)), the congestion degree and the average travel time calculated by taking statistics of pieces of the probe information with the same condition as the correspondence condition, and a number N of pieces of the probe information used to calculate the congestion degree and the average travel time. For example, the probe statistical information illustrated in FIG. 4 indicates that the congestion degree is "crowded" and the average travel time is "25 seconds" for a link with a link ID "100001," in the up direction, in a sunny weather, from 10:00 to 10:15, on May 10. The probe statistical information also indicates that the number N of pieces of the probe information used to calculate such information is "6567 pieces."

The center communication device 14 is a communication device that communicates with the vehicles 3 and a VICS (registered trademark) center via a network 15. In the embodiment, the probe information and the distribution information is transmitted to and received from the vehicles 3 via the center communication device 14.

Figure 5:
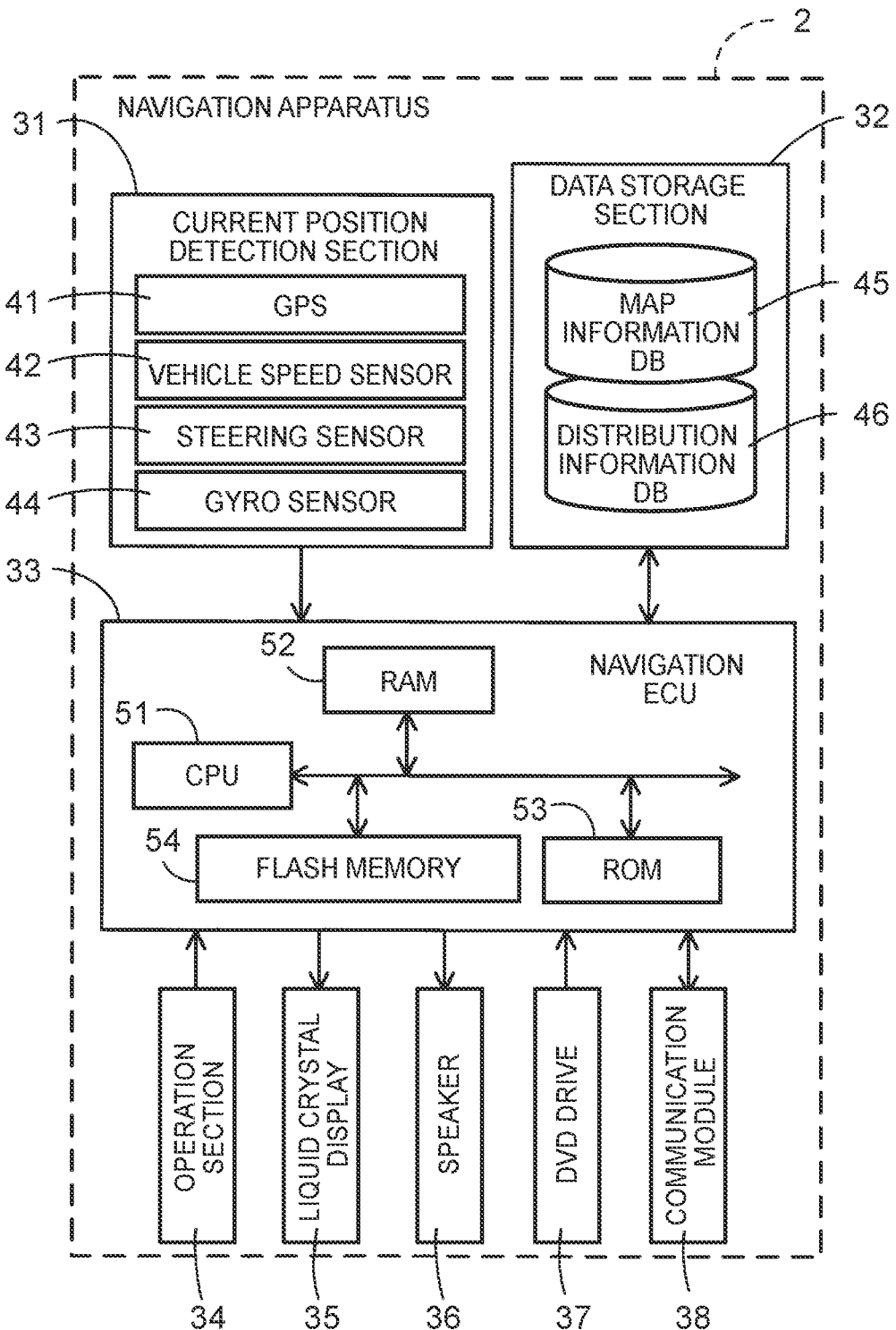
FIG. 5 is a block diagram schematically illustrating a control system of the navigation apparatus according to the embodiment.

Next, a schematic configuration of the navigation apparatus 2 mounted on the vehicle 3 will be described with reference to FIG. 5. FIG. 5 is a block diagram illustrating the navigation apparatus 2 according to the embodiment.

As illustrated in FIG. 5, the navigation apparatus 2 according to the embodiment has: a current position detection section 31 that detects the current position of the vehicle 3 on which the navigation apparatus 2 is mounted; a data storage section 32 that stores various data; a navigation ECU 33 that performs various types of computation processing on the basis of input information; an operation section 34 that receives an operation from a user; a liquid crystal display 35 that displays, to the user, a map of an area around the vehicle, route information on a route found through route search processing to be discussed later, and so forth; a speaker 36 that outputs audio route guidance; a DVD drive 37 that reads a DVD that serves as a storage medium; and a communication module 38 that communicates with an information center such as the probe center 4 and the VICS (registered trademark: Vehicle Information and Communication System) center. (As used herein, the term "storage medium" is not intended to encompass transitory signals.)

The constituent elements of the navigation apparatus 2 will be sequentially described below.

The current position detection section 31 is composed of a GPS 41, a vehicle speed sensor 42, a steering sensor 43, a gyro sensor 44, and so forth, and can detect the current position of the vehicle, the orientation, the travel speed of the vehicle, the current time, and so forth. In particular, the vehicle speed sensor 42 is a sensor that detects the travel distance of the vehicle and the vehicle speed, and generates pulses in accordance with rotation of drive wheels of the vehicle to output a pulse signal to the navigation ECU 33. The navigation ECU 33 counts the generated pulses to calculate the rotational speed of the drive wheels and the travel distance. It is not necessary that the navigation apparatus 2 should include all of the four sensors, and the navigation apparatus 2 may be configured to include only one or a plurality of such sensors.

The data storage section 32 includes a hard disk (not illustrated) that serves as an external storage device and a storage medium, and a recording head (not illustrated) that serves as a driver that reads a map information DB 45, a distribution information DB 46, a predetermined program, and so forth stored in the hard disk and that writes predetermined data into the hard disk. The data storage section 32 may be constituted of a memory card or an optical disk such as a CD or a DVD in place of the hard disk.

The map information DB 45 is storage means for storing link data on roads (links), node data on node points, branch point data on branch points, location data on locations such as facilities, map display data for displaying a map, search data for searching for a route, retrieval data for retrieving a location, and so forth, for example.

The stored search data include various data for use in route search processing for searching for a route from a departure location (e.g. the current position of the vehicle) to a set destination location as discussed later. Specifically, the stored search data include cost calculation data used to calculate a search cost such as a cost (hereinafter referred to as an "intersection cost") obtained by quantifying the degree of suitability of an intersection (node) for a route and a cost (hereinafter referred to as a "link cost") obtained by quantifying the degree of suitability of a link that constitutes a road for a route.

The intersection cost is set for each node corresponding to an intersection included in the route as the object for calculation of the search cost, and calculated in accordance with the presence or absence of a traffic signal, the travel route (that is, whether the vehicle travels straight ahead, makes a right turn, or makes a left turn) of the vehicle when passing through the intersection, and so forth.

The link cost is set for each link included in the route as the object for calculation of the search cost, and calculated on the basis of the length of the link and in consideration of the average travel time, the congestion degree, and so forth specified by the probe center 4, in addition to the road attribute, road type, road width, and number of lanes of the link.

The distribution information DB 46 is storage means for storing the distribution information (see FIG. 4) distributed from the probe center 4 and including the average travel time and the congestion degree specified for each link. The map information DB 45 and the distribution information DB 46 may be stored in an external server to be acquired by the navigation apparatus 2 through communication.

The navigation ECU (electronic control unit) 33 is an electronic control unit that controls the entire navigation apparatus 2, and includes a CPU 51 that serves as a computation device and a control device, and internal storage devices such as a RAM 52 that is used as a working memory when the CPU 51 performs various types of computation processing and that stores route data etc. when a route is found, a ROM 53 that stores a control program, a route search process program (see FIG. 6) to be discussed later, and so forth, and a flash memory 54 that stores a program read from the ROM 53. The navigation ECU 33 has various types of means as processing algorithms. For example, cost calculation means calculates a cost value of a link or a node on the basis of calculation material information (probe information) that serves as a material for calculating the cost value. Reliability degree specifying means specifies the reliability degree of the calculated cost value of the link or the node on the basis of the number of pieces of the calculation material information used to calculate the cost value of the link or the node. Cost correction means corrects the cost value of the link or the node, the reliability degree of Which has been specified, on the basis of the reliability degree specified by the reliability degree specifying means. Route search means searches for a recommended route using the cost value corrected by the cost correction means.

The operation section 34 is operated to input a departure location at which travel is started and a destination location at which travel is ended, and has a plurality of operation switches (not illustrated) such as various keys and buttons. The navigation ECU 33 performs control so as to execute various types of associated operation on the basis of a switch signal output in response to a depression of a switch or the like. The operation section 34 may have a touch panel provided on the front surface of the liquid crystal display 35. The operation section 34 may also have a microphone and a speech recognition device.

The liquid crystal display 35 displays a map image including roads, traffic information, operational guidance, an operation menu, key guidance, a route for guidance from a departure location to a destination location, guidance information on a travel along a route for guidance, news, weather forecasts, the time, mails, television programs, and so forth.

The speaker 36 outputs audio guidance on travel along a route for guidance and guidance on traffic information on the basis of an instruction from the navigation ECU 33.

The DVD drive 37 is a drive that can read data stored in a storage medium such as a DVD and a CD. Music and video is reproduced, the map information DB 45 is updated, etc. on the basis of the read data.

The communication module 38 is a communication device that receives various types of information such as congestion information, restriction information, traffic accident information, and so forth transmitted from a traffic information center, e.g. the MICS (registered trademark) center and the probe center 4, and may be a cellular phone or a DCM, for example. The communication module 38 is also used to transmit and receive the probe information and the distribution information to and from the probe center 4.

Figure 6:
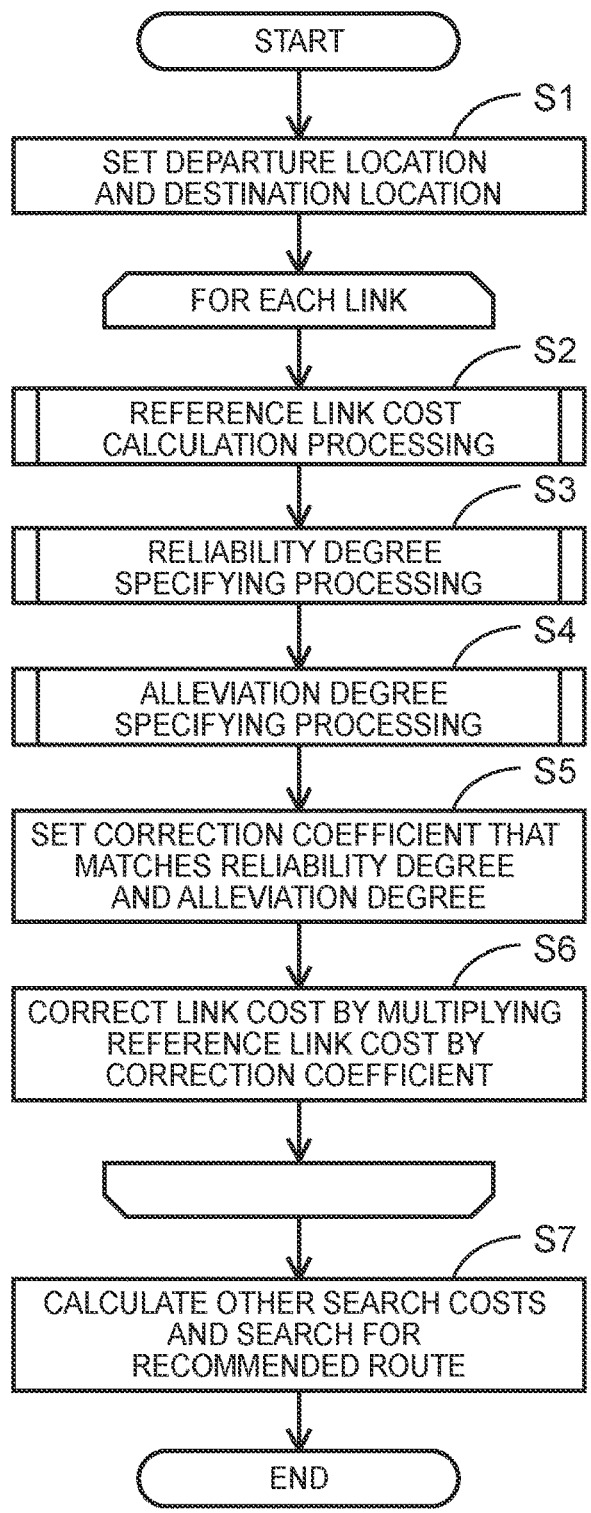
FIG. 6 is a flowchart of a route search processing program according to the embodiment.

Subsequently, route search processing program executed by the CPU 51 of the navigation apparatus 2 which constitutes the route search system 1 according to the embodiment configured as described above will be described with reference to FIG. 6. FIG. 6 is a flowchart of the route search processing program according to the embodiment. Here, the route search processing program is a program executed in the case where the navigation apparatus 2 has received a predetermined operation for searching for a route to search for a recommended route from a departure location to a destination location. The program illustrated in the flowchart of FIGS. 6, 8, 10, and 11 described below is stored in the RAM 52 and the ROM 53 of the navigation apparatus 2, and executed by the CPU 51.

In the route search processing program, first, in step (hereinafter abbreviated as "S") 1, the CPU 51 acquires a departure location and a destination location, The departure location may be the current position of the vehicle, or may be a desired location (e.g. home) designated by the user. The destination location is acquired on the basis of an operation (e.g. an operation of searching for or selecting a facility) by the user received by the operation section 34.

The processing in S2 to S6 described below is executed for each link as the object for calculation of the link cost. The processing proceeds to S7 after the processing in S2 to S6 is executed for all the links as the object for calculation of the link cost. The links as the object for calculation of the link cost are links that are present between the departure location and the destination location and that may constitute the recommended route.

First, in S2, the CPU 51 executes reference link cost calculation processing (FIG. 8) to be discussed later. The reference link cost calculation processing is processing of calculating the link cost of a link to be processed in consideration of not only the road attribute, road type, road width, and number of lanes of the link but also the average travel time, the congestion degree, and so forth specified by the probe center 4.

Next, in S3, the CPU 51 executes reliability degree specifying processing (FIG. 10) to be discussed later. The reliability degree specifying processing is processing of specifying the reliability degree of the calculated link cost of the link to be processed on the basis of the number N of pieces of the probe information used to calculate the link cost. The reliability degree is specified in four stages, namely "1 (high)" to "4 (low)."

Subsequently, in S4, the CPU 51 executes alleviation degree specifying processing (FIG. 11) to be discussed later. The alleviation degree specifying processing is processing of specifying the alleviation degree, which indicates the degree of alleviation, in the case where the correspondence condition for extracting pieces of the probe information, from which the link cost is calculated, has been alleviated in calculating the link cost of the link to be processed in S3. The alleviation degree is specified in three stages, namely "1 (small)" to "3 (large)."

After that, in S5, the CPU 51 sets a correction coefficient in accordance with the reliability degree specified in S3 and the alleviation degree specified in S4. Specifically, as illustrated in FIG. 7, the correction coefficient is determined on the basis of a combination of the reliability degree and the alleviation degree. As illustrated in FIG. 7, the correction coefficient is set to be lower as the reliability degree is higher. Meanwhile, the correction coefficient is set to be lower as the alleviation degree is smaller.

Next, in S6, the CPU 51 corrects the value of the link cost by multiplying the value of the reference link cost calculated in S2 by the correction coefficient set in S5. The CPU 51 then determines the value after the correction as the final link cost of the link to be processed. Thus, the finally calculated value of the link cost of links with a large correction coefficient, that is, links, the reliability degree of the calculated link cost of which is low, and links, the correspondence condition for which has been alleviated to a large degree, is corrected so as to be large, and thus such links are less likely to be included in the recommended route. On the other hand, the finally calculated value of the link cost of links with a small correction coefficient, that is, links, the reliability degree of the calculated link cost of which is high, and links, the correspondence condition for which has been alleviated to a small degree, is corrected so as to be small, and thus such links are more likely to be included in the recommended route.

In S7, which is executed after the link cost is calculated for all the links as the object for calculation of the link cost, the CPU 51 calculates search costs other than the link cost, such as an intersection cost obtained by quantifying the degree of suitability of an intersection (node) for a route and a toll cost obtained by quantifying the degree of expense required for travel, for example. The CPU 51 then searches for the recommended route using the calculated search costs. Specifically, the CPU 51 uses a Dijkstra's algorithm known in the art to determine a route, the total of the cost values of which is the smallest, as the recommended route. The CPU 51 may be configured to also search for candidate routes (e.g. a distance-priority route, a general road-priority route, and a toll road-priority route) other than the recommended route using different search conditions.

After that, guidance on the recommended route found in S7 is provided to the user via the liquid crystal display 35 etc. The recommended route, guidance on which is provided on the basis of a subsequent operation by the user, is set as the route for guidance for the navigation apparatus 2, and guidance for travel based on the set route for guidance is provided.

Next, sub processing of the reference link cost calculation processing executed in S2 will be described with reference to FIG. 8. FIG. 8 is a flowchart of sub processing program of the reference link cost calculation processing.

First, in S11, the CPU 51 acquires the number N of pieces of the probe information to be extracted in order to calculate the link cost of the link to be processed. Specifically, the CPU 51 acquires, among the distribution information (FIG. 4) distributed from the probe center 4, the number N of pieces of the probe information which are links to be processed that are correlated with the same correspondence condition (the same date-and-time classification, the same weather classification, the same travel direction, and the same travel mode (specifically, the direction of entry into the link and the direction of exit from the link)) and used to calculate the average vehicle speed and the average travel time, as the number N of pieces of the probe information to be extracted in order to calculate the link cost of the link to be processed.

Next, in S12, the CPU 51 determines whether or not the number N of pieces of the probe information acquired in S11 is equal to or less than 999.

In the case where it is determined that the number N of pieces of the probe information to be extracted in order to calculate the link cost of the link to be processed is equal to or less than 999 (S12: YES), it is acknowledged that the number of pieces of the probe information for calculating the link cost is not sufficient, and the processing proceeds to S14. In the case where it is determined that the number N of pieces of the probe information to be extracted in order to calculate the link cost of the link to be processed is more than 999 (S12: NO), it is acknowledged that the number of pieces of the probe information for calculating the link cost is sufficient, and the processing proceeds to S13.

In S13, the CPU 51 reads, among the distribution information (FIG. 4) distributed from the probe center 4, the average vehicle speed and the average travel time of the link to be processed that is correlated with the same correspondence condition (the same date-and-time classification, the same weather classification, the same travel direction, and the same travel mode (specifically, the direction of entry into the link and the direction of exit from the link)). The CPU 51 then calculates the link cost of the link to be processed using both or one of the average vehicle speed and the average travel time which have been read. The link cost is calculated in consideration of the road attribute, road type, road width, number of lanes, and so forth, besides the average vehicle speed and the average travel time. After that, the processing proceeds to S3.

In S14, the CPU 51 alleviates the correspondence condition, which is a condition for extracting pieces of the probe information, from which the link cost is calculated, to increase the number N of pieces of the probe information to be extracted in order to calculate the link cost of the link to be processed. Specifically, the CPU 51 alleviates one or more of the following conditions (A) to (D).

(A) Travel mode condition
(B) Time classification condition
(C) Date/day-of-the-week classification condition
(D) Weather classification condition Here, for the "(A) travel mode condition," one or both of the direction of entry into the link and the direction of exit from the link are excluded from the correspondence condition to increase the number N of pieces of the probe information to be extracted in order to calculate the link cost of the link to be processed. The alleviation is performed in a plurality of stages.

(Stage 1 (small alleviation)) "traveling through the same link with the same directions of entry and exit"
(Stage 2) "traveling through the same link and exiting to the same link"
(Stage 3) "traveling through the same link after entry from the same link"
(Stage 4 (large alleviation)) "traveling through the same link"

Accordingly, in the case of calculating the link cost of a link D after entry from a link A and before exiting to a link E as illustrated in FIG. 9, for example, pieces of the probe information correlated with a travel mode in which the vehicle enters the link D from the link A and exits to the link E are extracted in (stage 1); pieces of the probe information correlated with a travel mode in which the vehicle enters the link 1) from any of links A to C and exits to the link E are extracted in (stage 2); pieces of the probe information correlated with a travel mode in which the vehicle enters the link 1) from the link A and exits to any of the links E to G are extracted in (stage 3); and pieces of the probe information correlated with a travel mode in which the vehicle travels through the link D after entry from any link and exists to any link in (stage 4). That is, the number N of pieces of the probe information to be extracted in order to calculate the link cost of the link to be processed is increased by alleviating the correspondence condition.

For the "(B) time classification condition," the time classification is widened to increase the number N of pieces of the probe information to be extracted in order to calculate the link cost of the link to be processed. The alleviation is performed in a plurality of stages.

(Stage 1 (small alleviation)) "classified by 15 minutes"
(Stage 2) "classified by 30 minutes"
(Stage 3) "classified by one hour"
(Stage 4 (large alleviation)) "classified by three hours"

Accordingly, if a route search is performed at 10:10, for example, pieces of the probe information for 10:00 to 10:15 are extracted in (stage 1); pieces of the probe information for 10:00 to 10:30 are extracted in (stage 2); pieces of the probe information for 10:00 to 11:00 are extracted in (stage 3); and pieces of the probe information for 10:00 to 13:00 are extracted in (stage 4). That is, the number N of pieces of the probe information to be extracted in order to calculate the link cost of the link to be processed is increased by alleviating the correspondence condition.

For the "(C) date/day-of-the-week classification condition," the date/day-of-the-week classification is widened to increase the number N of pieces of the probe information to be extracted in order to calculate the link cost of the link to be processed. The alleviation is performed in a plurality of stages.

(Stage 1 (small alleviation)) "singular-day classification" or "day-of-the-week classification (except on singular days)"
(Stage 2) "classified in accordance with whether a weekday or a holiday"
(Stage 3 (large alleviation)) "no classification"

The term "singular days" refers to days on which the road status is peculiar compared to other days such as year-end and New Year holidays, GW days and Bon festival days. Accordingly, if a route search is performed on Saturday, May 3, for example, only pieces of the probe information for the GW period (e.g. April 29 to May 5), which are also singular days, are extracted in (stage 1); pieces of the probe information for holidays are extracted in (stage 2); and all pieces of the probe information, regardless of the date and the day of the week, are extracted in (stage 3), In (stage 2), the singular days may be considered as holidays regardless of the day of the week, or may be considered as weekdays, except for Saturdays and Sundays, in accordance with the day of the week. On the singular days, alternatively, alleviation may not be performed since the road status is peculiar.

Meanwhile, if a route search is performed on Monday, June 23, which is not a singular day, for example, pieces of the probe information for Mondays, which belong to the same day of the week as June 23, are extracted in (stage 1); pieces of the probe information for weekdays are extracted in (stage 2); and all pieces of the probe information, regardless of the date and the day of the week, are extracted in (stage 3).

That is, the number N of pieces of the probe information to be extracted in order to calculate the link cost of the link to be processed is increased by alleviating the correspondence condition.

For the "(D) weather classification condition," the weather classification is widened to increase the number N of pieces of the probe information to be extracted in order to calculate the link cost of the link to be processed. The alleviation is performed in a plurality of stages.

(Stage 1 (small alleviation)) "classified into four groups, namely sunny, cloudy, rainy, and snowy"
(Stage 2) "classified into two groups, namely sunny and cloudy, and others"
(Stage 3 (large alleviation)) "no classification"

Accordingly, if a route search is performed when it is cloudy, for example, pieces of the probe information for a cloudy weather, which belong to the same group, are extracted in (stage 1); pieces of the probe information for a sunny weather and a cloudy weather, which belong to the same group, are extracted in (stage 2); and all pieces of the probe information, regardless of the weather, are extracted in (stage 3). That is, the number N of pieces of the probe information to be extracted in order to calculate the link cost of the link to be processed is increased by alleviating the correspondence condition.

In S14, the CPU 51 first alleviates the correspondence condition, which has been in (stage 1), to (stage 2), and thereafter determines again whether or not the number N of pieces of the probe information to be extracted in order to calculate the link cost of the link to be processed is more than 999. If the number N of pieces of the probe information is equal to or less than 999, alleviation is further performed sequentially in (stage 3) and (stage 4). In the case where the number N of pieces of the probe information does not become more than 999 even if one of the conditions (A) to (D) is alleviated to the maximum, alleviation is similarly performed also for the other conditions. It is desirable that the probe center 4 should determine whether or not the number N of pieces of the probe information to be extracted in order to calculate the link cost of the link to be processed is more than 999 after the correspondence condition is alleviated, and that the navigation apparatus 2 should acquire the determination results.

After that, the probe center 4 extracts, from the probe information DB 12, pieces of the probe information which are links to be processed that are correlated with the same correspondence condition as the correspondence condition alleviated in S14, and calculates again the average vehicle speed and the average travel time on the basis of the extracted probe information. In S15, the CPU 51 acquires the average vehicle speed and the average travel time, which have been calculated again, from the probe center 4. By alleviating the correspondence condition, the number of pieces of the probe information extracted from the probe information DB 12 in order to calculate the average vehicle speed and the average travel time is increased. That is, the average vehicle speed and the average travel time which have been calculated have accurate values compared to those before the alleviation. The average vehicle speed and the average travel time may be calculated by the navigation apparatus 2.

Next, in S16, the CPU 51 calculates the link cost of the link to be processed using both or one of the average vehicle speed and the average travel time newly acquired in S15. The link cost is calculated in consideration of the road attribute, road type, road width, number of lanes, and so forth, besides the average vehicle speed and the average travel time. After that, the processing proceeds to S3.

Next, sub processing of the reliability degree specifying processing executed in S3 will be described with reference to FIG. 10. FIG. 10 is a flowchart of sub processing program of the reliability degree specifying processing.

First, in S21, the CPU 51 acquires the number N of pieces of the probe information that have been extracted in order to calculate the link cost of the link to be processed. In the case where the correspondence condition has been alleviated in the processing in S14, the CPU 51 acquires the number N of pieces of the probe information that have been extracted after the alleviation.

Next, in S22, the CPU 51 determines whether or not the number N of pieces of the probe information acquired in S21 is equal to or less than 9999.

In the case where it is determined that the number N of pieces of the probe information that have been extracted in order to calculate the link cost of the link to be processed is equal to or less than 9999 (S22: YES), the processing proceeds to S24. In the case where it is determined that the number N of pieces of the probe information that have been extracted in order to calculate the link cost of the link to be processed is more than 9999 (S22: NO), in contrast, the processing proceeds to S23.

In S23, the CPU 51 acknowledges that the reliability degree of the value of the link cost calculated in S2 is particularly high, and sets the reliability degree to "1." After that, the processing proceeds to S4.

In S24, meanwhile, the CPU 51 determines whether or not the number N of pieces of the probe information acquired in S21 is equal to or less than 4999.

In the case where it is determined that the number N of pieces of the probe information that have been extracted in order to calculate the link cost of the link to be processed is equal to or less than 4999 (S24: YES), the processing proceeds to S26. In the case where it is determined that the number N of pieces of the probe information that have been extracted in order to calculate the link cost of the link to be processed is more than 4999 but equal to or less than 9999 (S24: NO), in contrast, the processing proceeds to S25.

In S25, the CPU 51 acknowledges that the reliability degree of the value of the link cost calculated in S2 is relatively high, and sets the reliability degree to "2." After that, the processing proceeds to S4.

In S26, the CPU 51 determines whether or not the number N of pieces of the probe information acquired in S21 is equal to or less than 999, or whether or not the correspondence condition has been alleviated in the processing in S14.

In the case where it is determined that the number N of pieces of the probe information that have been extracted in order to calculate the link cost of the link to be processed is equal to or less than 999, or that the correspondence condition has been alleviated in the processing in S14 even if the number N is more than 999 (S26: YES), the processing proceeds to S28. In the case where it is determined that the number N of pieces of the probe information that have been extracted in order to calculate the link cost of the link to be processed is more than 999, and that the correspondence condition has not been alleviated in the processing in S14 (S26: NO), the processing proceeds to S27.

In S27, the CPU 51 acknowledges that the reliability degree of the value of the link cost calculated in S2 is low, and sets the reliability degree to "3." After that, the processing proceeds to S4.

In S28, meanwhile, the CPU 51 acknowledges that the reliability degree of the value of the link cost calculated in S2 is particularly low, and sets the reliability degree to "4." After that, the processing proceeds to S4.

Figure 11:
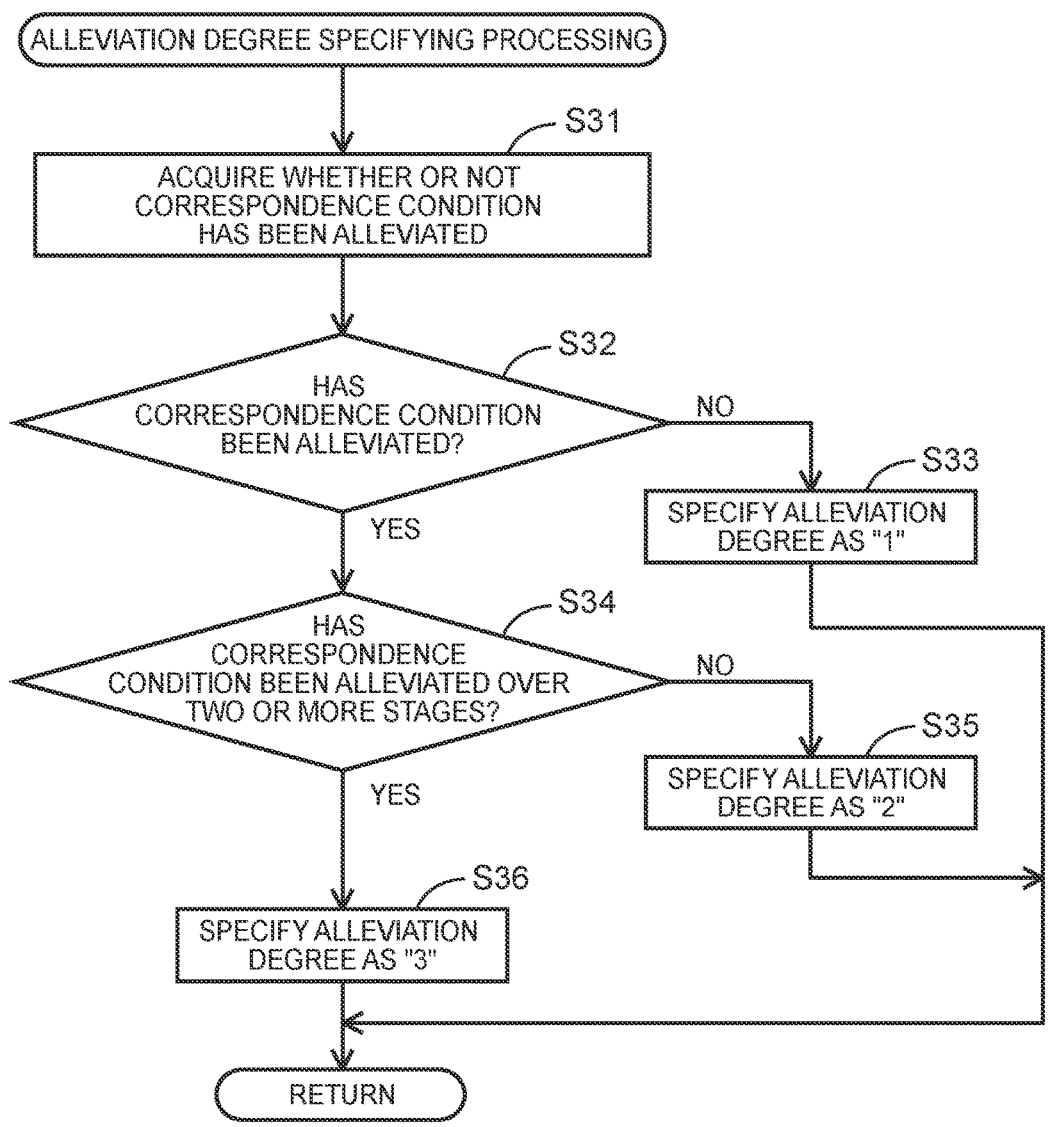
FIG. 11 is a flowchart of a sub processing program of an alleviation degree specifying processing.

Next, sub processing of the alleviation degree specifying processing executed in S4 will be described with reference to FIG. 11. FIG. 11 is a flowchart of sub processing program of the alleviation degree specifying processing.

First, in S31, the CPU 51 acquires whether or not the correspondence condition has been alleviated in the processing in S14, and, in the case where the correspondence condition has been alleviated, over how many stages the correspondence condition has been alleviated.

Next, in S32, the CPU 51 determines whether or not the correspondence condition has been alleviated in the processing in S14.

In the case where it is determined that the correspondence condition has been alleviated in the processing in S14 (S32: YES), the processing proceeds to S34. In the case where it is determined that the correspondence condition has not been alleviated in the processing in S14 (S32: NO), in contrast, the processing proceeds to S33.

In S33, the CPU 51 acknowledges that the value of the link cost calculated in S2 was calculated from only particularly closely correlated pieces of the probe information, and sets the alleviation degree to "1." After that, the processing proceeds to S5.

In S34, meanwhile, the CPU 51 determines whether or not the correspondence condition has been alleviated over two or more stages in the processing in S14.

In the case where it is determined that the correspondence condition has been alleviated over two or more stages in the processing in S14 (S34: YES), the processing proceeds to S36. In the case where it is determined that the correspondence condition has been alleviated over only one stage in the processing in S14 (S34: NO), in contrast, the processing proceeds to S35.

In S35, the CPU 51 acknowledges that the value of the link cost calculated in S2 was calculated from relatively closely correlated pieces of the probe information, and sets the alleviation degree to "2." After that, the processing proceeds to S5.

In S36, the CPU 51 acknowledges that the value of the link cost calculated in S2 was calculated from pieces of the probe information including slightly correlated information, and sets the alleviation degree to "3." After that, the processing proceeds to S5.

In the route search system 1 according to the embodiment, the route search method performed by the route search system 1, and the computer program executed by the route search system 1, as has been described in detail above, the probe center 4 collects probe information from the vehicles 3 which travel across the country, and the navigation apparatus 2 calculates the link cost of a link on the basis of the probe information in the case where a search for a recommended route is performed (S2); the reliability degree of the calculated link cost is specified on the basis of the number of pieces of the probe information used to calculate the link cost of the link (S3); the value of the link cost, the reliability degree of which has been specified, is corrected on the basis of the specified reliability degree (S6); and an search for a recommended route is performed. using the corrected value of the link cost (S7). Thus, it is possible to correct a cost value in consideration of the reliability degree of the link cost used for route search. As a result, it is possible to find a more appropriate route for a user even in the case where the route includes roads with small amounts of traffic.

It should be understood that the embodiment described above is not limiting, and that various improvements and modifications may be made without departing from the scope and spirit of the inventive principles.

For example, in the embodiment, the processing of correcting the cost value in S3 to S6 is performed for the cost value of a link cost. However, the processing of correcting the cost value in S3 to S6 may be performed for the cost value of a node cost. Furthermore, the processing of correcting the cost value in S3 to S6 may be performed for both a link cost and a node cost.

In the embodiment, in addition, in correcting the cost value of a link cost, the cost value is multiplied by a correction. coefficient determined on the basis of a combination of the reliability degree and the alleviation degree. However, the correction coefficient may be determined on the basis of only the reliability degree, or may be determined on the basis of only the alleviation degree. In the case where the correction coefficient is determined on the basis of only the reliability degree, the correction coefficient is configured to be smaller as the reliability degree is higher. In the case where the correction coefficient is determined on the basis of only the alleviation degree, meanwhile, the correction coefficient is configured to be smaller as the alleviation degree is smaller.

In correcting the cost value of a link cost, the cost value is multiplied by a correction coefficient determined on the basis of a combination of the reliability degree and the alleviation degree. However, the cost value may be corrected by adding or subtracting a correction coefficient determined on the basis of a combination of the reliability degree and the alleviation degree to or from the cost value.

In the embodiment, in addition, the correspondence condition is alleviated in the case where the number of pieces of the probe information that have been extracted in order to calculate the cost value of a link or a node is equal to or less than 999. However, the number may be different from 999 such as 500 or 2000, for example.

In the embodiment, in addition, the probe information has been described as an example of the calculation material information which serves as a material for calculating the cost value. However, information other than the probe information may also be used. Such information may be travel information on other vehicles acquired through vehicle-to-vehicle communication, or may be information on a large number of unspecified vehicles collected by vehicle detectors, optical beacons, and so forth installed on roads, for example. Furthermore, such information may be information on a past travel history of the vehicle which searches for a route.

The above-described principles may be applied to devices having a route search function besides the navigation apparatus. For example, the above-described. principles may also be applied to a portable terminal such as a cellular phone and a smartphone, a tablet terminal, a personal computer, and so forth (hereinafter referred to as a portable terminal etc.). In the embodiment, in addition, the subject of execution of the route search processing program illustrated in FIG. 6 is the navigation apparatus 2. However, the probe center 4 may be configured to execute a part or the whole of the route search processing program. In the case where the probe center 4 executes the whole of the route search processing program, the probe center 4 is configured to acquire information on a departure location and a destination location from the navigation apparatus 2, and to transmit a finally found recommended route to the navigation apparatus 2.

While a route search system according to a specific has been described above, the route search system may be configured as described below, and the following effect can be achieved in such cases.

For example, a first configuration is as follows.

A route search system (1) that searches for a recommended route using a cost value of a link or a node that constitutes a route, including: cost calculation means (51) for calculating the cost value of the link or the node on the basis of calculation material information that serves as a material for calculating the cost value; reliability degree specifying means (51) for specifying a reliability degree of the calculated cost value of the link or the node on the basis of the number of pieces of the calculation material information used to calculate the cost value of the link or the node; cost correction means (51) for correcting the cost value of the link or the node, the reliability degree of which has been specified, on the basis of the reliability degree specified by the reliability degree specifying means; and route search means (51) for searching for the recommended route using the cost value corrected by the cost correction means.

With the route search system configured as described above, it is possible to find a more appropriate route for a user, even in the case where the route includes roads with small amounts of traffic, by correcting the cost value of a link or a node used for route search in consideration of the reliability degree of the cost value.

A second configuration is as follows.

The cost correction means (51) corrects the cost value of the link or the node, the reliability degree of which has been specified, such that the cost value is lower as the reliability degree specified by the reliability degree specifying means (51) is higher.

With the route search system configured as described above, the cost value is corrected so as to be small for a link or a node, the reliability degree of the calculated cost value of which is high, and corrected so as to be large for a link or a node, the reliability degree of the calculated cost value of which is low. Thus, it is possible that links or nodes, the reliability degree of the calculated cost value of Which is high, are more likely to be included in the recommended route than links or nodes, the reliability degree of the calculated cost value of which is low Thus, it is possible to suppress the possibility that a route that is unsuitable for the user is selected as the recommended route.

A third configuration is as follows.

The reliability degree specifying means (51) specifies the reliability degree of the cost value of the link or the node as being higher as the number of pieces of the calculation material information used to calculate the cost value of the link or the node is larger.

With the route search system configured as described above, it is possible to set the reliability degree of the cost value of a link or a node, the cost value of which has been calculated on the basis of a large number of pieces of the calculation material information and is expected to be accurate, to be high. Thus, it is possible to reduce the possibility that a route that is unsuitable for the user is selected as the recommended route.

A fourth configuration is as follows.

The calculation material information includes probe information acquired from a vehicle.

With the route search system configured as described above, the cost value of a link or a node is calculated on the basis of information acquired from a large number of vehicles that travel across the country as the probe information. Thus, it is possible to calculate the cost value of a link or a node more accurately. Meanwhile, it is possible to find a more appropriate route for the user by correcting the cost value, even in the case where the route includes roads with small amounts of traffic and for which it is difficult to acquire a large number of pieces of the probe information.

A fifth configuration is as follows.

The cost calculation means (51) calculates the cost value of the link or the node on the basis of information related to the link or the node acquired from map information and an average travel time or a congestion degree specified from the probe information.

With the route search system configured as described above, it is possible to calculate the cost value of a link or a node more accurately.

A sixth configuration is as follows.

The cost correction means (51) corrects the cost value of the link or the node by multiplying the cost value calculated by the cost calculation means (51) by a coefficient that matches the reliability degree specified by the reliability degree specifying means (51).

With the route search system configured as described above, the cost value of a link or a node used for route search can be corrected to an appropriate value that matches whether the reliability degree of the cost value is high or low. Thus, it is possible to find a more appropriate route for the user.

A seventh configuration is as follows.

The cost calculation means (51) extracts a piece of the calculation material information corresponding to the link or the node as an object for calculation of the cost value, among pieces of the calculation material information that serve as materials for calculating the cost value, and calculates the cost value of the link or the node using the extracted piece of the calculation material information; and the cost calculation means (51) includes condition alleviation means for increasing the number of pieces of the calculation material information to be extracted in order to calculate the cost value of the link or the node by alleviating a correspondence condition for extraction.

With the route search system configured as described above, the number of pieces of the calculation material information to be extracted can be increased even in the case where the number of pieces of the calculation material information to be extracted in order to calculate the cost value of the link or the node is small. Thus, it is possible to improve the accuracy of the cost value even in the case where a link or a node with a small amount of traffic is the object.

An eighth configuration is as follows.

The calculation material information is travel information on a vehicle, to which a link or a node through which the vehicle has traveled, a direction of entry into the link or the node, and a direction of exit from the link or the node have been added as a travel mode; the cost calculation means (51) extracts a piece of the calculation material information to which the travel mode corresponding to the link or the node as the object for calculation of the cost value has been added; and the condition alleviation means (51) increases the number of pieces of the calculation material information to be extracted in order to calculate the cost value of the link or the node by excluding one or both of the direction of entry and the direction of exit from the correspondence condition for the travel mode.

With the route search system configured as described above, the number of pieces of the calculation material information to be extracted can be increased by alleviating the correspondence condition related to the travel mode even in the case where the number of pieces of the calculation material information to be extracted in order to calculate the cost value of the link or the node is small. Thus, it is possible to improve the accuracy of the cost value even in the case where a link or a node with a small amount of traffic is the object.

A ninth configuration is as follows.

The calculation material information is travel information on a vehicle, to which a time of travel of the vehicle has been added; the cost calculation means (51) extracts a piece of the calculation material information to which a time included in the same time classification as a time for calculation of the cost value has been added; and the condition alleviation means (51) increases the number of pieces of the calculation material information to be extracted in order to calculate the cost value of the link or the node by widening the time classification.

With the route search system configured as described above, the number of pieces of the calculation material information to be extracted can be increased by alleviating the correspondence condition related to the time even in the case where the number of pieces of the calculation material information to be extracted in order to calculate the cost value of the link or the node is small. Thus, it is possible to improve the accuracy of the cost value even in the case where a link or a node with a small amount of traffic is the object.

A tenth configuration is as follows.

The calculation material information is travel information on a vehicle, to which a date or day of the week of travel of the vehicle has been added; the cost calculation means (51) extracts a piece of the calculation material information to which a date or day of the week included in the same date classification or day-of-the-week classification as a date or day of the week for calculation of the cost value has been added; and the condition. alleviation means (51) increases the number of pieces of the calculation material information to be extracted in order to calculate the cost value of the link or the node by widening the date classification or the day-of-the-week classification.

With the route search system configured as described above, the number of pieces of the calculation material information to be extracted can be increased by alleviating the correspondence condition related to the date or the day of the week even in the case where the number of pieces of the calculation material information to be extracted in order to calculate the cost value of the link or the node is small. Thus, it is possible to improve the accuracy of the cost value even in the case where a link or a node with a small amount of traffic is the object.

An eleventh configuration is as follows.

The calculation material information is travel information on a vehicle, to which a weather during travel of the vehicle has been added; the cost calculation means (51) extracts a piece of the calculation material information to which a weather included in the same weather classification as a weather during calculation of the cost value has been added; and the condition alleviation means (51) increases the number of pieces of the calculation material information to be extracted in order to calculate the cost value of the link or the node by widening the weather classification.

With the route search system configured as described above, the number of pieces of the calculation material information to be extracted can be increased by alleviating the correspondence condition related to the weather even in the case where the number of pieces of the calculation material information to be extracted in order to calculate the cost value of the link or the node is small. Thus, it is possible to improve the accuracy of the cost value even in the case where a link or a node with a small amount of traffic is the object.

The invention claimed is:

1. A route search system that searches for a recommended route using a cost value of a link or a node that constitutes a route, comprising:
    a processor programmed to:
        calculate the cost value of the link or the node on the basis of calculation material information that serves as a material for calculating the cost value;
        specify a reliability degree of the calculated cost value of the link or the node on the basis of a number of pieces of the calculation material information used to calculate the cost value of the link or the node;
        correct the cost value of the link or the node, the reliability degree of which has been specified, on the basis of the specified reliability degree; and
        search for the recommended route using the corrected cost value.

2. The route search system according to claim 1, wherein the processor is programed to:
    correct the cost value of the link or the node, the reliability degree of which has been specified, such that the cost value is lower as the specified reliability degree is higher.

3. The route search system according to claim 1, wherein the processor is programmed to:
    specify the reliability degree of the cost value of the link or the node as being higher as the number of pieces of the calculation material information used to calculate the cost value of the link or the node is larger.

4. The route search system according to claim 1, wherein:
    the calculation material information includes probe information acquired from a vehicle.

5. The route search system according to claim 4, wherein the processor is programmed to:
    calculate the cost value of the link or the node on the basis of information related to the link or the node acquired from map information and an average travel time or a congestion degree specified from the probe information.

6. The route search system according to claim 1, wherein the processor is programmed to:
    correct the cost value of the link or the node by multiplying the calculated cost value by a coefficient that matches the specified reliability degree.

7. The route search system according to claim 1, wherein the processor is programmed to:
    extract a piece of the calculation material information corresponding to the link or the node as an object for calculation of the cost value, among pieces of the calculation material information that serve as materials for calculating the cost value;

calculate the cost value of the link or the node using the extracted piece of the calculation material information; and increase the number of pieces of the calculation material information to be extracted in order to calculate the cost value of the link or the node by alleviating a correspondence condition for extraction.

8. The route search system according to claim 7, wherein:

the calculation material information is travel information on a vehicle, to which a link or a node through which the vehicle has traveled, a direction of entry into the link or the node, and a direction of exit from the link or the node have been added as a travel mode; and the processor is programmed to:

extract a piece of the calculation material information to which the travel mode corresponding to the link or the node as the object for calculation of the cost value has been added; and increase the number of pieces of the calculation material information to be extracted in order to calculate the cost value of the link or the node by excluding one or both of the direction of entry and the direction of exit from the correspondence condition for the travel mode.

9. The route search system according to claim 7, wherein:

the calculation material information is travel information on a vehicle, to which a time of travel of the vehicle has been added; and the processor id programmed to:

extract a piece of the calculation material information to which a time included in the same time classification as a time for calculation of the cost value has been added; and increase the number of pieces of the calculation material information to be extracted in order to calculate the cost value of the link or the node by widening the time classification.

10. The route search system according to claim 7, wherein:

the calculation material information is travel information on a vehicle, to which a date or day of the week of travel of the vehicle has been added; and the processor is programmed to:

extract a piece of the calculation material information to which a date or day of the week included in the same date classification or day-of-the-week classification as a date or day of the week for calculation of the cost value has been added; and increase the number of pieces of the calculation material information to be extracted in order to calculate the cost value of the link or the node by widening the date classification or the day-of-the-week classification.

11. The route search system according to claim 7, wherein:

the calculation material information is travel information on a vehicle, to which a weather during travel of the vehicle has been added; and the processor is programmed to:

extract a piece of the calculation material information to which a weather included in the same weather classification as a weather during calculation of the cost value has been added; and increase the number of pieces of the calculation material information to be extracted in order to calculate the cost value of the link or the node by widening the weather classification.

12. A route search method for searching for a recommended route using a cost value of a link or a node that constitutes a route, comprising:

calculating the cost value of the link or the node on the basis of calculation material information that serves as a material for calculating the cost value;

specifying a reliability degree of the calculated cost value of the link or the node on the basis of a number of pieces of the calculation material information used to calculate the cost value of the link or the node;

correcting the cost value of the link or the node, the reliability degree of which has been specified, on the basis of the specified reliability degree; and searching for the recommended route using the corrected cost value.

13. A computer-readable storage medium storing a computer program for searching for a recommended route using a cost value of a link or a node that constitutes a route, the computer program causing a computer to:

calculate the cost value of the link or the node on the basis of calculation material information that serves as a material for calculating the cost value;

specify a reliability degree of the calculated cost value of the link or the node on the basis of a number of pieces of the calculation material information used to calculate the cost value of the link or the node;

correct the cost value of the link or the node, the reliability degree of which has been specified, on the basis of the specified reliability degree; and search for the recommended route using the corrected cost value.

* * * * *